United States Patent
Silver et al.

(10) Patent No.: US 9,051,858 B2
(45) Date of Patent: Jun. 9, 2015

(54) COMPRESSION IGNITION ENGINE SYSTEM WITH DIESEL PARTICULATE FILTER COATED WITH NOX REDUCTION CATALYST AND STABLE METHOD OF OPERATION

(75) Inventors: Ronald Graham Silver, Peoria, IL (US); David Mark Heaton, nr Peterborough (GB); James Joshua Driscoll, Dunlap, IL (US); Anibal Villatoro Prats, United Kingdom (GB); Lyn McWilliam, Peterborough (GB)

(73) Assignee: Caterpillar Inc., Peoria, IL (US)

( * ) Notice: Subject to any disclaimer, the term of this patent is extended or adjusted under 35 U.S.C. 154(b) by 802 days.

(21) Appl. No.: 13/075,326

(22) Filed: Mar. 30, 2011

(65) Prior Publication Data

US 2012/0247085 A1    Oct. 4, 2012

(51) Int. Cl.
  *F01N 3/035*  (2006.01)
  *F01N 3/08*   (2006.01)
  *F01N 3/20*   (2006.01)

(52) U.S. Cl.
  CPC .............. *F01N 3/035* (2013.01); *F01N 3/0821* (2013.01); *F01N 3/0842* (2013.01); *F01N 3/2066* (2013.01); *F01N 2610/02* (2013.01); *Y02T 10/24* (2013.01)

(58) Field of Classification Search
  CPC ....... F01N 3/023; F01N 3/035; F01N 3/0821; F01N 3/0842; F01N 3/2066; F01N 2250/02; F01N 2900/1606; F02D 41/029; F02D 2200/0812
  USPC ............................ 60/286, 295, 297, 301, 324
  See application file for complete search history.

(56) References Cited

U.S. PATENT DOCUMENTS

| 7,229,597 B2 | 6/2007 | Patchett et al. |
| 2007/0144152 A1 | 6/2007 | Lueders |
| 2008/0276604 A1 * | 11/2008 | Hosaka ........................ 60/295 |

(Continued)

FOREIGN PATENT DOCUMENTS

| DE | 102005025737 A1 * | 1/2007 |
| EP | 2105199 | 9/2009 |

(Continued)

OTHER PUBLICATIONS

Machine translation of DE 10 2005 025 737 A1 accessed Sep. 11, 2014.*

(Continued)

*Primary Examiner* — Kenneth Bomberg
*Assistant Examiner* — Jonathan Matthias
(74) *Attorney, Agent, or Firm* — Liell & McNeil Attorneys, PC; Baker Hostetler (57) ABSTRACT

An engine system includes an electronically controlled compression ignition engine configured to burn diesel fuel to produce an exhaust with a temperature and NOx to soot ratio. An aftertreatment system is fluidly connected to the engine and includes a diesel oxidation catalyst, a reductant supply, and a diesel particulate filter coated with a NOx reduction catalyst but not the diesel oxidation catalyst. A soot load density in the diesel particulate filter is stabilized by oxidizing soot at about a same rate as the compression ignition engine is supplying soot to the aftertreatment system without active regeneration. A NOx reduction reaction is catalyzed by the NOx reduction catalyst on the diesel particulate filter.

20 Claims, 3 Drawing Sheets

(56) References Cited

U.S. PATENT DOCUMENTS

| | | |
|---|---|---|
| 2009/0019831 A1 | 1/2009 | Heibel et al. |
| 2010/0058746 A1 | 3/2010 | Pfeifer et al. |
| 2010/0115930 A1 | 5/2010 | Brown et al. |
| 2010/0180579 A1 | 7/2010 | Huang et al. |
| 2010/0180580 A1 | 7/2010 | Boorse et al. |
| 2010/0287915 A1 | 11/2010 | Zhan et al. |
| 2011/0064633 A1* | 3/2011 | Huang et al. ............... 423/213.2 |
| 2011/0209460 A1* | 9/2011 | He et al. ............................ 60/274 |
| 2012/0230881 A1* | 9/2012 | Boger et al. .................. 422/187 |

FOREIGN PATENT DOCUMENTS

| | | |
|---|---|---|
| GB | 2457651 | 8/2009 |
| WO | 2009100412 | 8/2009 |
| WO | 2010016631 | 2/2010 |
| WO | 2010075345 | 7/2010 |
| WO | 2010097638 | 9/2010 |

OTHER PUBLICATIONS

Cavataio, Warner, Girard, Ura, Dobson, Lambert; Laboratory Study of Soot, Propylene, and Diesel Fuel Impact on Zeolite-Based SCR Filter Catalysts; SAE International J. Fuels Lubr.; 2009; p. 342-368; vol. 2, Issue 1; Dearborn, Michigan.

Lee, Paratore, Brown; Evaluation of Cu-Based SCR/DPF Technology for Diesel Exhaust Emission Control; SAE International J. Fuels Lubr.; 2008; p. 96-101; vol. 1, Issue 1.

* cited by examiner

COMPRESSION IGNITION ENGINE SYSTEM WITH DIESEL PARTICULATE FILTER COATED WITH NOX REDUCTION CATALYST AND STABLE METHOD OF OPERATION

TECHNICAL FIELD

The present disclosure relates generally to a compression ignition engine coupled with an exhaust aftertreatment system, and more particularly to stabilizing a soot load density on a diesel particulate filter coated with a NOx reduction catalyst without active regeneration.

BACKGROUND

The conventional wisdom holds that a diesel particulate filter must be periodically regenerated in order to reduce back pressure on the engine and/or to prevent a runaway exothermic soot oxidation reaction in a soot cake trapped in the filter. Reducing back pressure on the engine is generally associated with more efficient operation, and hence an incremental reduction in fuel consumption by the engine. A runaway exothermic oxidation reaction is generally undesirable since temperatures can become briefly so high that the filter substrate (e.g., zeolite) may become cracked or otherwise damaged to the point that the filter may be compromised. The threshold soot load density in the diesel particulate filter at which a runaway exothermic oxidation reaction might occur is reduced when the diesel particulate filter is coated with a diesel oxidation catalyst as in many conventional systems. The diesel oxidation catalyst serves to catalyze a reaction between nitrogen oxide in the exhaust with available oxygen to produce nitrogen dioxide. Active regeneration of a diesel particulate filter refers to a process by which the accumulated soot in the diesel particulate filter is oxidized by increasing the temperature at the filter in order to encourage soot oxidation. The active regeneration process is sometimes carried out with fuel injected into an aftertreatment system upstream from the diesel particulate filter, or by the use of electrical heaters or the like. By initiating the regeneration process at a relatively low soot load density, the oxidation reaction can be controlled, and a runaway exothermic reaction, and the damage risks associated with such a reaction, can be avoided. There is often a trade off between the additional fuel consumption necessary to perform active regeneration of the diesel particulate filter verses the additional fuel needed by the engine to overcome back pressure associated with a soot accumulation on the diesel particulate filter.

Apart from treating soot, most aftertreatment systems also attempt to reduce the presence of NOx at the tailpipe by catalyzing a NOx reduction reaction with an added reductant, such as urea. In many conventional systems, urea is injected into the aftertreatment system downstream from the diesel particulate filter. After mixing with the exhaust, a chemical reaction is encouraged with a NOx reduction catalyst to convert nitrogen dioxide and ammonia from the urea into nitrogen and water before exiting the tailpipe. In general, the amount of urea injected into the aftertreatment system must balance the amount of NOx present in the exhaust in order to avoid an inadequate reaction producing NOx at the tailpipe (NOx slip) or too much injection resulting in ammonia undesirably leaving the tailpipe (ammonia slip). In order to consume less urea, the conventional wisdom has generally been to adjust the engine calibration to produce less NOx while otherwise still meeting the demands on the engine. In general, NOx production increases with increased combustion temperature, as does engine efficiency. Therefore, adjusting an engine calibration to produce less NOx generally results in a reduction in engine efficiency, and hence an associated incremental increase in fuel consumption. Thus, the tradeoff with regard to NOx often relates to an incremental increase in fuel consumption in order to generate less NOx at the time of combustion along with a reduced demand for urea injection in order to arrive at a balanced reduction reaction.

The conventional wisdom has thus been a search for engine calibrations, diesel particulate filter regeneration frequency and urea injection quantities that result in an overall liquid consumption (fuel plus urea) that is acceptable while meeting emissions regulations. These strategies are typically carried out with an aftertreatment system that includes, in series, a fuel injector to facilitate regeneration, a diesel particulate filter coated with a diesel oxidation catalyst, a urea injection system, a mixer, and finally a NOx reduction catalyst.

Although the conventional aftertreatment system structure has seen success and become somewhat widespread in use, there have been efforts to locate the NOx reduction reaction at the diesel particulate filter by coating the same with a NOx reduction catalyst. For instance, published U.S. Patent Application 2010/0058746 teaches a diesel particulate filter coated with both a diesel oxidation catalyst and a NOx reduction catalyst. However, this reference teaches a necessity of frequent active regeneration of the diesel particulate filter.

The present disclosure is directed to an alternative aftertreatment strategy in conjunction with an engine system that can effectively compete with conventional aftertreatment system designs.

SUMMARY OF THE DISCLOSURE

In one aspect, a method of operating an engine system includes producing exhaust with a temperature and a NOx to soot ratio by burning diesel fuel in a compression ignition engine. Soot load density in a diesel particulate filter of an aftertreatment system fluidly connected to the compression ignition engine is stabilized by oxidizing soot at about a same rate as the compression ignition engine is supplying soot to the aftertreatment system. A NOx reduction reaction is catalyzed with a NOx reduction catalyst coated on the diesel particulate filter.

In another aspect, an engine system includes an electronically controlled compression ignition engine configured to burn diesel fuel to produce an exhaust with a temperature and a NOx to soot ratio. An aftertreatment system is fluidly connected to the engine, and includes a diesel oxidation catalyst, a reductant supply and a diesel particulate filter coated with a NOx reduction catalyst but not the diesel oxidation catalyst. The NOx to soot ratio and the temperature correspond to a stable soot load density in the diesel particulate filter without active regeneration.

DETAILED DESCRIPTION

Figure 1:
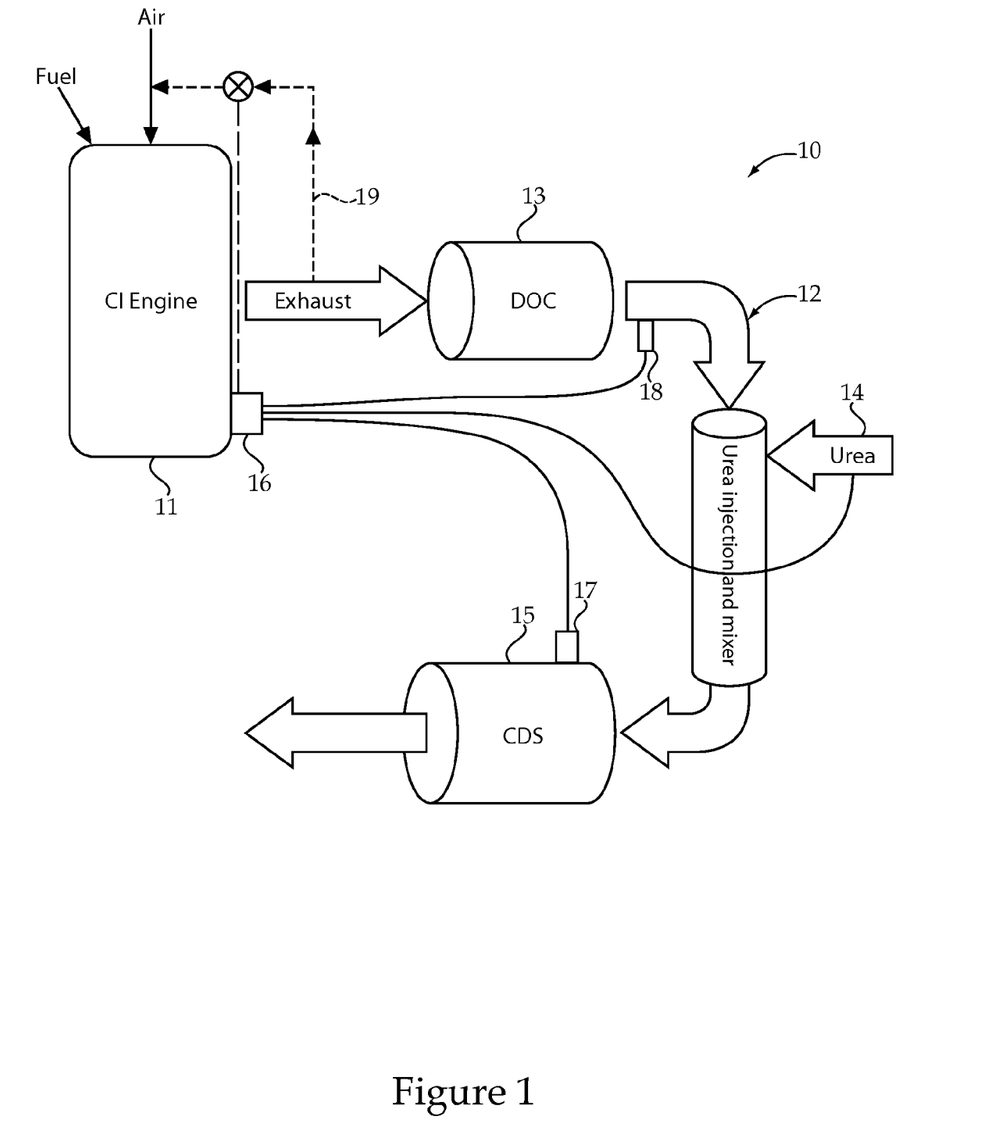
FIG. 1 is a schematic view of an engine system according to the present disclosure.

Referring to FIG. 1, an engine system 10 according to the present disclosure includes an electronically controlled compression ignition engine 11 that is configured to burn diesel fuel to produce an exhaust with a temperature and a NOx to soot ratio. An aftertreatment system 12 is fluidly connected to engine 11, and includes a diesel oxidation catalyst 13, a reductant (e.g., urea) supply 14 and a diesel particulate filter 15 (CDS) that is coated with a NOx reduction catalyst but not the diesel oxidation catalyst. The term "CDS" merely refers to a shorthand version of a Combined Diesel particulate filter coated with a Scr catalyst. An electronic controller 16 is in control communication with engine 11. Electronic controller 16 may include an aftertreatment stabilization algorithm configured to estimate a soot load density in the diesel particulate filter 15, and may be configured to adjust engine operation to stabilize the soot load density. Engine system 10 may include an exhaust gas recirculation system 19 that may include a control valve that is controlled by electronic controller 16 to adjust the amount, if any, of exhaust gas recirculated to the engine 11. Electronic controller 16 may be configured to control engine 11 such that the NOx to soot ratio in the exhaust and the temperature of the exhaust correspond to a stable soot load density in the diesel particulate filter 15 without active regeneration. A stable soot load density in the context of the present disclosure means a soot load density that does not continue to grow until becoming plugged, but instead arrives at a steady state soot load density. Active regeneration refers to the concept of adding heat energy to the aftertreatment system 12 in order to initiate and/or maintain an oxidation reaction of soot to reduce a soot load density on a diesel particulate filter. Thus, engine systems 10 according to the present disclosure may not include any fuel injector and/or electric heating element or the like in the aftertreatment system 12 in order to actively regenerate diesel particulate filter 15.

Although, electronic controller 16 may be set to control an engine operating condition corresponding to a NOx to a soot ratio and exhaust temperature that produces a stable soot load density at diesel particulate filter 15 without feedback control, the present disclosure also contemplates a feedback strategy by which the electronic controller estimates a temperature at filter 15 and/or an engine out NOx to soot ratio and/or the soot load density in diesel particulate filter 15 using any appropriate means known in the art. In this regard, regardless of whether the engine system 10 operates open loop or closed loop, system 10 may include a temperature sensor 17 positioned in aftertreatment system 12 in communication with electronic controller 16. The aftertreatment stabilization algorithm of electronic controller 16 may include a filter temperature estimation algorithm for estimating a temperature at the diesel particulate filter 15 using a temperature from temperature sensor 17. Although temperature sensor 17 in the illustrated embodiment is located at diesel particulate filter 15, those skilled in the art will appreciate that the temperature sensor(s) could be located elsewhere in aftertreatment system 12 without departing from the present disclosure. In such a case, temperature at the diesel particulate filter 15 could be estimated utilizing predetermined correlations between the temperature sensed elsewhere in the aftertreatment system 12 and the corresponding temperature at diesel particulate filter 15.

In addition to temperature sensor 17, aftertreatment system 12 may include a NOx sensor 18 positioned in aftertreatment system 12 in communication with electronic controller 16. The aftertreatment stabilization algorithm of electronic controller 16 may include a NOx to soot estimation algorithm for estimating a NOx to soot ratio of exhaust at diesel particulate filter 15. Estimating soot out from engine 11 is known in the art, and need not be taught here. Those skilled in the art will appreciate that the NOx sensor 18 may be located at any suitable location in aftertreatment system 12 and utilize correlations and other tools for estimating a NOx to soot ratio elsewhere in aftertreatment system 12. Electronic controller 16 may include any known sensors, predetermined data and known techniques for estimating NOx to soot ratio at any location in aftertreatment system 12, including diesel particulate filter 15.

Like most conventional engine systems, engine system 10 includes electronic controller 16 controlling the mass flow rate of reductant (e.g. urea) injection into aftertreatment system 12 to provide a balanced NOx reduction reaction at the NOx reduction catalyst in diesel particulate filter 15. Thus, electronic controller 16 may include a suitable reductant injection control algorithm that utilizes known techniques for minimizing and/or avoiding either NOx slip or ammonia slip events at a tailpipe downstream from diesel particulate filter 15.

Diesel particulate filter 15 may be of any suitable construction, such as a zeolite wall flow structure of a type well known in the art. Other suitable substrates include, but are not limited to, vanadia or titania. The inlet and/or the outlet side of the diesel particulate filter walls may be coated with any suitable NOx reduction catalyst, such as copper. Other suitable catalysts include, but are not limited to, iron or mixed metal oxides. In order to provide a system capable of operating in a stable soot load density regime according to the present disclosure, the diesel particulate filter 15 may require a volumetric space velocity less than 70,000/hr. which corresponds to exhaust flow at a rated condition divided by the volume of the filter. In general this limitation corresponds to a larger volume SCR catalyst than an otherwise equivalent engine system according to prior art aftertreatment system designs.

In the past, the conventional wisdom in dealing with emission regulations has generally been to seek strategies for engine operation that produce lower quantities of NOx and soot, and then rely upon an aftertreatment system to remove the remaining undesirable emissions. Thus, the engine and aftertreatment system in the conventional wisdom have been treated somewhat independently. The present disclosure seeks to integrate the operation of the aftertreatment system and engine a way that better leverages engine operation efficiency. For instance, the present disclosure teaches engine operation that produces a relatively high NOx output relative to the low NOx teachings associated with the conventional wisdom, which generally results in a hotter more efficient engine operation. In general, hotter combustion is associated with higher NOx levels and improved engine efficiency, which corresponds to improved fuel economy. While the conventional wisdom might teach high amounts of exhaust gas recirculation and/or a low NOx engine operation calibration to suppress combustion temperatures and hence decrease NOx production, the present disclosure would teach in the opposite direction toward a lesser reliance upon exhaust gas recirculation or a less efficient low NOx engine calibration in order to produce relatively hotter combustion temperatures and higher NOx production output. In the conventional wisdom, NOx and soot are treated somewhat independently in the aftertreatment system. The present disclosure, on the otherhand, seeks to leverage high amounts of NOx present in the aftertreatment system to assist in soot oxidation, rather than causing ever higher reliance upon urea injection and a NOx reduction reaction to remove NOx prior to exiting at the tailpipe. One way this is accomplished in the present disclosure is to completely separate the diesel oxidation catalyst from the diesel particulate filter.

As is well known, the diesel oxidation catalyst performs the function of assisting in the conversion of nitrogen oxide in the exhaust to nitrogen dioxide. In the conventional wisdom, the diesel oxidation catalyst can be coated on a particulate filter, and inherently requires that soot loading be maintained well below that at which a runaway exothermic soot oxidation reaction could occur. For instance, the conventional wisdom might teach regenerating a diesel oxidation catalyst coated particulate filter when soot loading is on the order of 2-5 grams per liter in order to avoid loading in a neighborhood of about 6 grams per liter that could result in a runaway exothermic oxidation reaction in the soot cake that could, and likely would, damage and/or crack the filter substrate rendering the filter compromised. While the engine system 10 of the present disclosure could operate with a stable soot load density of less than 6 grams per liter, the engine system 10 according to the present disclosure may find a better overall efficiency in soot loading densities greater than 6 grams per liter, which would be unthinkable in the conventional wisdom. These higher soot loading densities according to the present disclosure are still limited by maintaining soot load densities less than those associated with the runaway exothermic soot oxidation reaction in a soot cake of a diesel particulate filter 15. However, because the diesel particulate filter 15 according to the present disclosure includes no diesel oxidation catalyst, the soot load densities associated with a runaway exothermic reaction are substantially higher than those associated with diesel oxidation catalyst particulate filters of the prior art. While the presence of a diesel oxidation catalyst can substantially lower the soot load density at which a runaway exothermic reaction soot oxidation reaction could occur, an uncoated or particulate filter coated with a NOx reduction catalyst is substantially higher, maybe on the order of 10½ or more grams per liter before a runaway exothermic reaction might occur. Fortunately, under certain operating conditions, a stable soot load density in an engine system 10 according to the present disclosure can be stably achieved at a low density substantially below that which a runaway exothermic soot oxidation reaction could occur. Thus, an example steady state soot load density according to the present disclosure could easily be in the range of from 3 to 11 grams per liter, but may be in the range of 9-10 grams per liter depending upon other considerations, including elevated urea supply requirements and elevated fuel consumption to overcome back pressure associated with higher soot loading on the diesel particulate filter.

There are certain constraints according to the present disclosure that should be met in order to create the conditions at which a stable soot load density can be achieved in the diesel particulate filter 15. For instance, the diesel particulate filter 15 should be located at a location in the aftertreatment system 12 corresponding to temperatures generally in excess of 180° C. Stable soot load densities are generally not available when exhaust temperature at the diesel particulate filter 15 are lower than 180° C. There is no real upper limit of temperature at which a stable soot load density can be achieved. However, as temperatures at the diesel particulate filter begin to exceed temperatures on the order of about 450° C., the efficiency of the NOx reduction reaction can be undermined. But an elevated temperature NOx reduction reaction can be remedied, to some extent, by increasing a supply of reductant into the aftertreatment system 12. Thus, a practitioner may want to design their system so that the temperature at the diesel particulate filter 15 is as hot as possible without undermining the NOx reduction reaction. For instance, a system that predominantly operates in a range where the temperature at the diesel particulate filter 15 is in a range of from 180° C. to 400° C. might be desirable.

Figure 2:
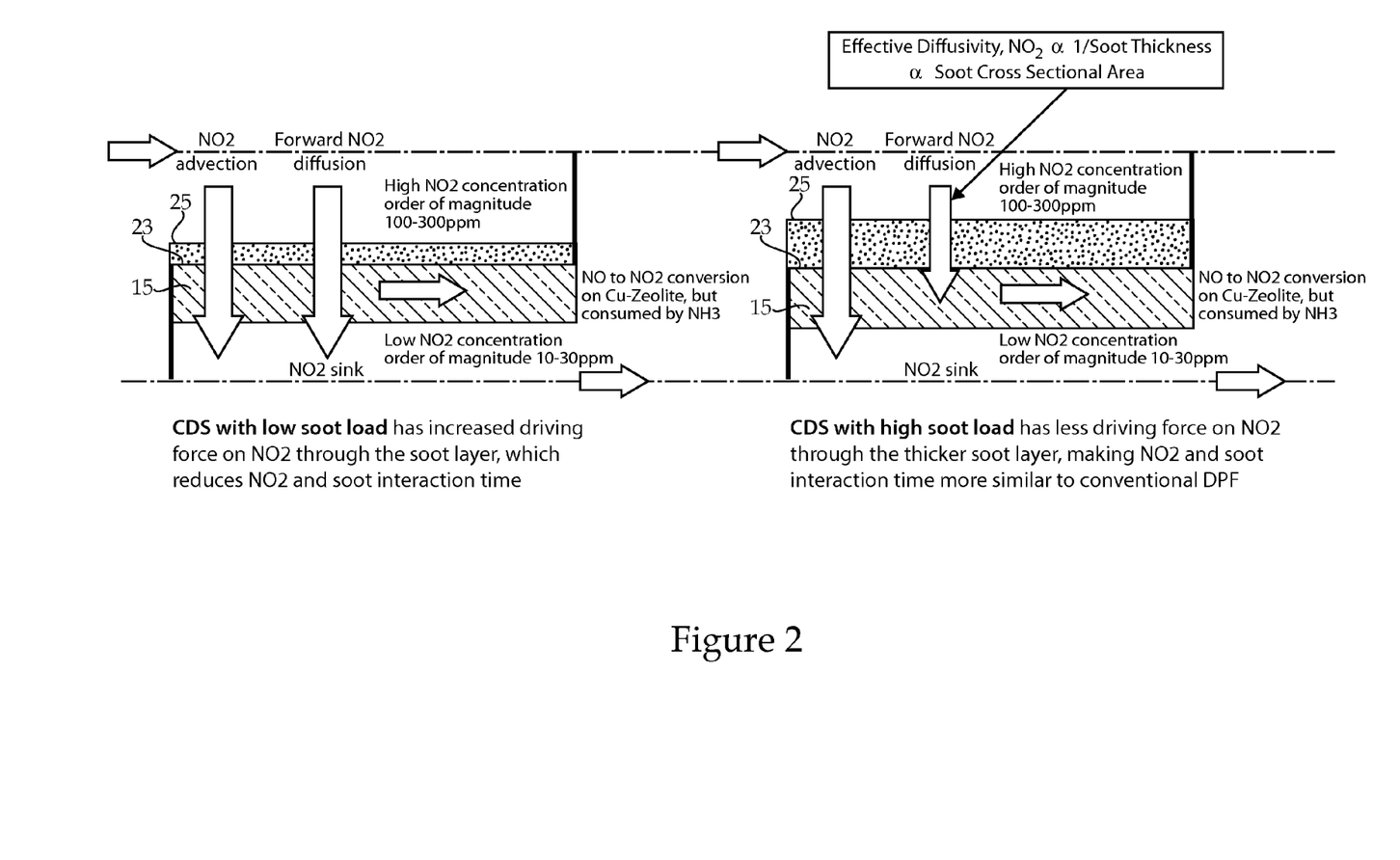
FIG. 2 is a partial sectioned pictorial view of a diesel particulate filter with stable low and high soot loads, respectively, according to the present disclosure.

Referring to FIG. 2, the illustrations show schematically how the diesel particulate filter of the present disclosure, and its associated soot load, affect the interaction between NOx and the soot cake and the NOx reduction reaction taking place at the NOx reduction catalyst coating 23. In particular, when the particulate filter has a relatively low soot load, there is an increased driving force on nitrogen dioxide through the soot layer 25, which reduces the nitrogen dioxide and soot interaction time. On the otherhand, at higher soot loads, there is a lesser driving force on the nitrogen dioxide through a bigger soot cake layer 25 making the nitrogen dioxide and soot interaction time more similar to a conventional diesel particulate filter according to the prior art. In general, the more interaction time available between nitrogen dioxide and the soot layer, results in a faster reaction rate of the soot being oxidized by the nitrogen dioxide, which combined with the rate of soot introduction from the engine results in a stable soot load density. Thus, with all other things being equal, if one can tolerate a higher soot load density in an engine system 10 according to the present disclosure, the rate of soot oxidation can be made equal to the rate of soot capture on the filter for a net soot accumulation rate of zero. $NO_2$ is converted to NO when the soot is oxidized with $NO_2$. While one could expect to expend more fuel to overcome the back pressure created by a higher soot load density according to the present disclosure relative to the conventional wisdom of the prior art, this incremental increase in fuel consumption is more than made up for by the improved efficiency associated with higher NOx production and the absence of fuel consumption to initiate and carry out active regeneration as in the prior art.

Figure 3:
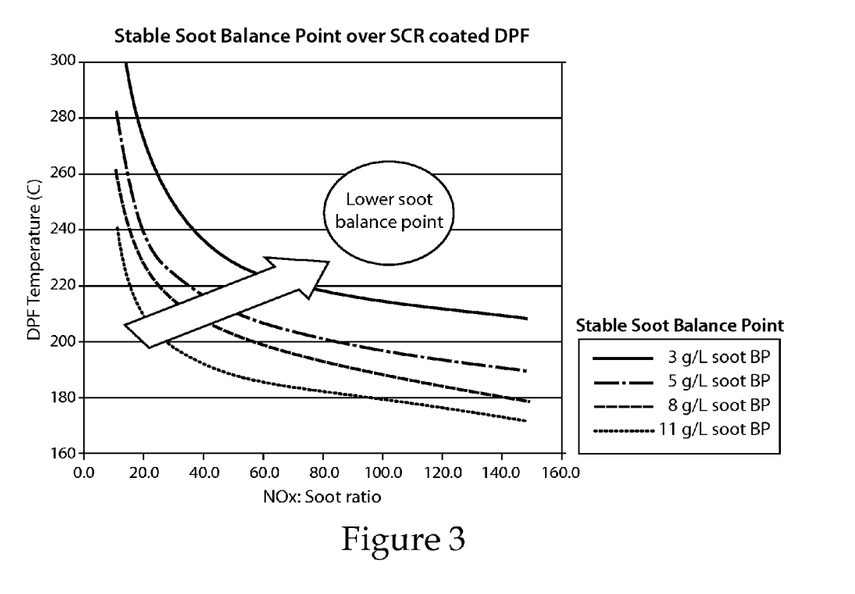
FIG. 3 is a graph of diesel particulate filter temperature verses engine out NOx to soot ratio in a region of operation according to the present disclosure.

As expected, achieving a stable soot load density is strongly a function of temperature as shown in FIG. 3. On one hand, soot oxidation reaction rates increase with temperature, but the effectiveness of a NOx reduction catalyst in promoting a NOx reduction reaction decreases with increasing temperature above some threshold on the order of 400-450° C. Thus, the NOx reduction catalyst coated diesel particulate filter according to the present disclosure should be located sufficiently downstream from the engine that temperatures are low enough at the catalyst to promote an efficient NOx reduction reaction, but not so cool as to undermine a sufficient oxidation of soot with nitrogen dioxide to achieve a stable soot load density. In other words, if the diesel particulate filter 15 according to the present disclosure is too hot, ever greater amounts of urea are necessary in order to achieve effective NOx reduction. On the otherhand, if the diesel particulate filter is too cool, soot load densities can become excessive since a stable soot oxidation reaction rate commencerate with the soot output from the engine cannot be achieved, such as below 180° C.

Apart from temperature at the diesel particulate filter 15, another constraint according to the present disclosure relates to NOx to soot ratios that are generally higher than the prevailing conventional wisdom associated wither the prior art. In the case of the present disclosure, the NOx to soot ratio may need to be greater than about 20 to 1 in order to ensure adequate nitrogen dioxide to enable a stabilized soot load density. On the otherhand, NOx to soot ratios on the order of up to 330 to 1 may be needed in order to maintain the system in a regime corresponding to a stabilized soot load density, especially when these diesel particulate filter is being operated at lower temperatures, as shown in the graph of FIG. 3. The present disclosure teaches that by carefully specifying exhaust contents (NOx: soot ratio) as a result of combustion characteristics and further carefully specifying exhaust conditions (temperature) at the diesel particulate filter 15, it is possible to have soot regeneration occur passively at an acceptable rate without risking a runaway exothermic soot oxidation reaction, without excessive back pressure on the engine, and without the performance costs associated with the actively regenerated systems of the prior art. In other words, by carefully designing engine system 10, one can stabilize a soot load density in the diesel particulate filter 15 of aftertreatment system 12 by oxidizing soot at about a same rate as the compression ignition engine is supplying soot to the aftertreatment system, while also catalyzing a NOx reduction reaction with a NOx reduction catalyst coated on the diesel particulate filter 15. The phrase "at about a same rate" means that with time the two rates will assymptotically become equal if all other conditions remain constant. In other words, the soot build up is stable, which is the opposite of unstable.

INDUSTRIAL APPLICABILITY

The present disclosure is generally applicable to compression ignition engines that burn diesel fuel to produce an exhaust with a temperature and a NOx to soot ratio. The present disclosure finds particular application to engine systems with a diesel particulate filter coated with a NOx reduction catalyst but not a diesel oxidation catalyst, and that can be positioned in the aftertreatment system at a location that exhibits a minimum temperature on the order of about 180° C. most of the time. In addition, the present disclosure is generally applicable to engine systems in which the diesel particulate filter 15 has a volumetric space velocity less than about 70,000/hr. In addition, the present disclosure is generally applicable to engines capable of producing a NOx to soot ratio in a range between 20 to 1 up to 330 to 1.

Referring again to FIG. 3, an engine system 10 according to the present disclosure needs to have the ability for the diesel particulate filter 15 to operate at temperatures that could be maintained inside or above (higher temperature) the graph of FIG. 3. In other words, in a temperature range of between 180 and 280° C. at the diesel particulate filter and with NOx to soot ratios on the order of 20 to 330, a wide range of stabilized soot load densities can be maintained on the diesel particulate filter. At higher temperatures above the graph of FIG. 3, relatively low stabilized to soot load densities can be expected, but a minimum NOx to soot ratio of about 20 to 1 is still needed. However, too high of temperatures may undermine the NOx reduction reaction at stated earlier. When engine system 10 is in operation, exhaust is produced with a temperature and a NOx to soot ratio by burning diesel fuel in the compression ignition engine 11 that is operating according to an engine calibration. Soot load density is stabilized in the diesel particulate filter 15 of the aftertreatment system 12 by oxidizing soot in a reaction at about a same rate as the compression ignition engine 11 is supplying soot to the aftertreatment system 12. The graph of FIG. 3 shows different soot balance points for different temperatures and NOx to soot ratios. Apart from achieving a stable soot load density, a NOx reduction reaction is catalyzed with a NOx reduction catalyst coated on the diesel particulate filter 15. Upstream from the diesel particulate filter 15, a reaction in the exhaust to combine nitrogen oxide with oxygen into nitrogen dioxide is accomplished with the help of a diesel oxidation catalyst 13. The NOx reduction reaction is facilitated by supplying a reductant 14, such as urea into the exhaust in the aftertreatment system 12 upstream from the diesel particulate filter 15.

The electronic engine controller 16 may make continuous estimates of the temperature at the diesel particulate filter 15 and the NOx to soot ratio of the exhaust in order to determine what the stable soot load density corresponds to under those conditions according to graph of FIG. 3. In the event that the engine system 10 is being controlled to some target soot load density, the engine may change from a first engine operation condition to a second engine operation condition responsive to the estimated temperature and NOx to soot ratio in order to move to some target soot load density balance point, such as 9 grams per liter. On the otherhand, the stabilized soot load density may change responsive to a change in engine operating conditions, such as by an operator changing a speed and load demand on engine 11 for whatever reason. The graph of FIG. 3 also shows that the engine system 10 has the ability to adjust from a first stable soot load density to a second stable soot load density by adjusting temperature and NOx to soot ratio within the graph the FIG. 3. Above the graph of FIG. 3, the stabilized soot load density becomes very sensitive to the NOx to soot ratio, but relative low soot load densities may be easily achieved. In fact, under certain operating conditions, a stabilized soot load density near zero may be possible without departing from the present disclosure. From another point of view, the same engine system 10 operating in a particular duty cycle in cold windy ambient conditions may result in a higher stabilized soot load density than for the same engine system operating in the same duty cycle under hot stagnate ambient conditions.

Figure 4:
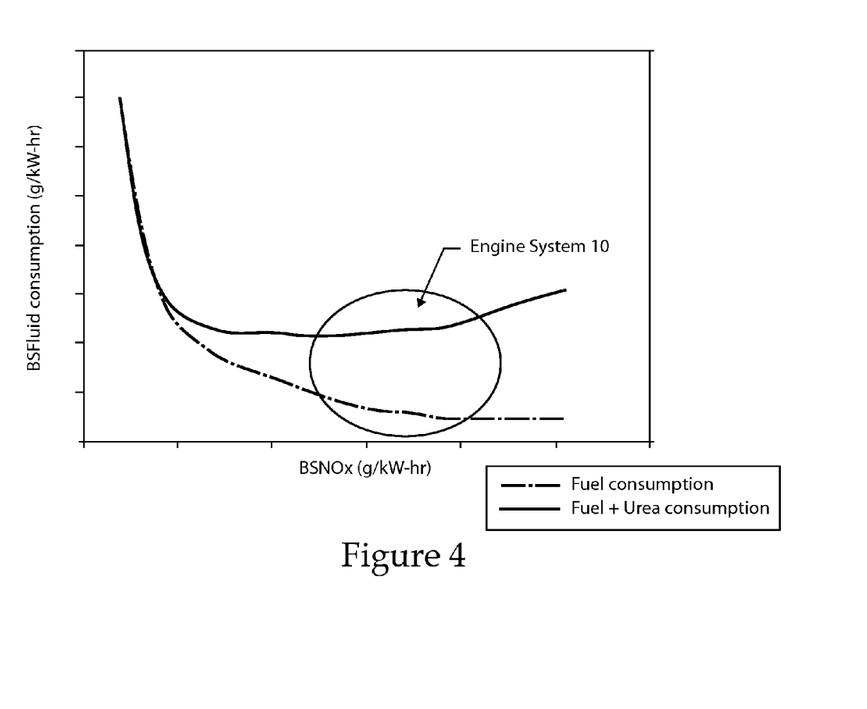
FIG. 4 is a graph of engine system fluid consumption verses brake specific NOx output for a range of different engine system configurations.

Referring to FIG. 4, a graph is shown of fluid consumption, both fuel and urea, verses NOx output of a range of engines in order to show where the engine system 10 operates relative to the prior art. The region shown by the oval represents the general area which the engine system 10 according to the present disclosure may be designed to operate. One could expect engines that include no aftertreatment to produce high amounts of NOx and operate more efficiently with better fuel consumption to the right of the area of operation designated with regard to the present disclosure. On the otherhand, engines with aftertreatment systems according to the prior art might be expected to operate substantially to the left of the outlined region since they tend to operate less efficiently in order to produce less NOx and thus tend to burn more fuel, but utilize less urea in order to remove the NOx that is produced. In addition, the system according to the prior art also typically requires fuel to be consumed in order to actively regenerate their diesel particulate filters.

Overall, one could expect an engine system 10 according to the present disclosure to incrementally burn less fuel because the engine operates more efficiently at higher temperatures producing higher NOx output, but might burn incrementally more fuel in order to overcome the elevated back pressure from a higher soot load density on the diesel particulate filter, and also consume greater quantities of urea in order to satisfactorily reduce higher NOx levels. However, the overall fuel plus urea consumption economy of an engine system 10 according to the present disclosure could be substantially better than engine systems according to the conventional wisdom that require active regeneration and degraded engine efficiency in order to produce lower NOx output rates.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. An engine system comprising:
 a compression ignition engine configured to burn diesel fuel and to produce an exhaust;
 an aftertreatment system fluidly connected to the compression ignition engine, and including a diesel oxidation catalyst, a reductant supply, and a diesel particulate filter coated with a NOx reduction catalyst but not the diesel oxidation catalyst; and
 an electronic controller in control communication with the compression ignition engine, the electronic controller electronically controlling the compression ignition engine to produce the exhaust with a NOx to soot ratio and a temperature corresponding to a stable soot load density of the diesel particulate filter without active regeneration, and
 wherein the stable soot load density is in a load range from 6 to 11 grams per liter.

2. The engine system of claim 1, wherein the electronic controller includes an aftertreatment stabilization algorithm configured to estimate a soot load density at the diesel particulate filter, and the electronic controller is configured to adjust engine operation to stabilize the soot load density.

3. The engine system of claim 2 including a temperature sensor positioned in the aftertreatment system in communication with the electronic controller; and
 wherein the aftertreatment stabilization algorithm includes a filter temperature estimate algorithm to estimate a temperature at the diesel particulate filter by using a temperature from the temperature sensor.

4. The engine system of claim 2 including a NOx sensor positioned in the aftertreatment system in communication with the electronic controller; and
 wherein the aftertreatment stabilization algorithm includes a NOx to soot ratio estimation algorithm to estimate a NOx to soot ratio of exhaust at the diesel particulate filter.

5. The engine system of claim 4 including a temperature sensor positioned in the aftertreatment system in communication with the electronic controller; and
 the aftertreatment stabilization algorithm includes a filter temperature estimate algorithm to estimate a temperature of exhaust at the diesel particulate filter using a temperature from the temperature sensor.

6. The engine system of claim 1, wherein the stable soot load density is less than a predetermined soot load density corresponding to a runaway exothermic soot oxidation reaction in a soot cake of the diesel particulate filter.

7. The engine of claim 1, wherein an inlet and an outlet side of the diesel particulate filter is coated with the NOx reduction catalyst.

8. An aftertreatment system comprising:
 a diesel particulate filter coated with a NOx reduction catalyst but not a diesel oxidation catalyst; and
 a soot cake trapped in the filter at a steady state soot load density, the steady state soot load density being in a range of 9-10 grams per liter, while a NOx reduction reaction takes place at the NOx reduction catalyst.

9. A method of operating an engine system comprising the steps of:
 electronically controlling, with an electronic controller, a compression ignition engine to produce exhaust with a temperature and a NOx to soot ratio corresponding to a stable soot load density by burning diesel fuel in the compression ignition engine;
 stabilizing a soot load density in a diesel particulate filter of an aftertreatment system fluidly connected to the compression ignition engine by oxidizing soot of the exhaust at about a same rate as the compression ignition engine is supplying the soot with the exhaust, based on the electronically controlling of the compression ignition engine, to the aftertreatment system; and
 catalyzing a NOx reduction reaction with a NOx reduction catalyst coated on the diesel particulate filter,
 wherein the stabilized soot load density is in a load range from 6 to 11 grams per liter.

10. The method of claim 9 including catalyzing a reaction in the exhaust to combine nitrogen oxide with oxygen into nitrogen dioxide with a diesel oxidation catalyst of the aftertreatment system upstream from the diesel particulate filter; and
 supplying a reductant into the exhaust in the aftertreatment system upstream from the diesel particulate filter.

11. The method of claim 10 including a step of estimating a temperature and NOx to soot ratio of the exhaust at the diesel particulate filter; and
 the step of electronically controlling the compression ignition engine includes changing from a first engine operation condition to a second engine operation condition responsive to the step of estimating the temperature and the NOx to soot ratio of the exhaust at the diesel particulate filter.

12. The method of claim 11 including estimating a soot load density on the diesel particulate filter; and
 limiting the estimated soot load density below a predetermined soot load density corresponding to a runaway exothermic soot oxidation reaction in a soot cake of the diesel particulate filter.

13. The method of claim 11 wherein the step of electronically controlling the compression ignition engine includes changing from the first engine operating condition to the second engine operating condition by changing a speed and a load demand of the compression ignition engine.

14. The method of claim 10 including adjusting from a first stable soot load density to a second stable soot load density responsive to changing an engine operating condition.

15. The method of claim 14, wherein the adjusting from the first stable soot load density to the second stable soot load density includes changing from a first NOx to soot ratio to a second NOx to soot ratio.

16. The method of claim 15, wherein the changing from the first NOx to soot ratio to the second NOx to soot ratio is performed in a range of ratios between 20:1 and 330:1.

17. The method of claim 14, wherein the adjusting from the first stable soot load density to the second stable soot load density includes changing from a first exhaust temperature to a second exhaust temperature.

18. The method of claim 17, wherein the changing from the first exhaust temperature to the second exhaust temperature is performed in a temperature range corresponding to a temperature at the diesel particulate filter between 180 and 280 degrees C.

19. The method of claim 17, wherein the adjusting from the first stable soot load density to the second stable soot load density includes changing from a first NOx to soot ratio to a second NOx to soot ratio.

20. The method of claim 1 including a step of adjusting from a first stable soot load density to a second stable soot load density;
 the adjusting step includes changing from a first NOx to soot ratio to a second NOx to soot ratio in a range of ratios between 20:1 and 330:1; and the adjusting step includes changing from a first exhaust temperature to a second exhaust temperature in a temperature range corresponding to a temperature at the diesel particulate filter between 180 and 280 degrees C.

* * * * *